US008200916B2

(12) United States Patent
Dor et al.

(10) Patent No.: US 8,200,916 B2
(45) Date of Patent: *Jun. 12, 2012

(54) WRITE SET BOUNDARY MANAGEMENT IN SUPPORT OF ASYNCHRONOUS UPDATE OF SECONDARY STORAGE

(75) Inventors: Shira Ben Dor, Givat Shmuel (IL); Amir Kredi, Tel Aviv-Jaffa (IL); Avied Zlotnick, Galil Tachton (IL); Henry Butterworth, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/361,504

(22) Filed: Jan. 28, 2009

(65) Prior Publication Data

US 2009/0138666 A1    May 28, 2009

Related U.S. Application Data

(63) Continuation of application No. 11/093,584, filed on Mar. 30, 2005, now Pat. No. 7,502,899.

(30) Foreign Application Priority Data

Mar. 31, 2004    (GB) .................................. 0407257.5

(51) Int. Cl.
*G06F 12/00* (2006.01)
*G06F 13/00* (2006.01)
*G06F 13/28* (2006.01)
*G06F 15/167* (2006.01)
*G06F 15/16* (2006.01)

(52) U.S. Cl. ........ 711/154; 711/141; 711/147; 711/161; 711/162; 709/213; 709/216; 709/217; 709/218; 709/219

(58) Field of Classification Search ........................ None
See application file for complete search history.

(56) References Cited

U.S. PATENT DOCUMENTS 5,592,618 A * 1/1997 Micka et al. .................... 714/54
6,463,501 B1 * 10/2002 Kern et al. .................... 711/100

* cited by examiner

*Primary Examiner* — Sanjiv Shah
*Assistant Examiner* — Marwan Ayash
(74) *Attorney, Agent, or Firm* — Michael J. Buchenhorner; Vazken Alexanian

(57) ABSTRACT

A color control node includes an interface for communicating with multiple storage controllers, wherein the storage controllers maintain a primary storage system at a primary site and a secondary storage system at a secondary site; and wherein the storage controllers maintain a current color and associate all writes with the current color without polling the color control node. The color control node also includes operational capability for issuing a polling command to instruct the storage controllers to poll the color control node for the current color prior to associating each write with a new color; receiving an acknowledgment of receipt of the polling command; changing the current color to a new color responsive to receiving the acknowledgment; issuing a storage command to the storage controllers indicating the new color; and instructing each storage controller to cease polling the color control node for the current color.

15 Claims, 3 Drawing Sheets

WRITE SET BOUNDARY MANAGEMENT IN SUPPORT OF ASYNCHRONOUS UPDATE OF SECONDARY STORAGE

CROSS-REFERENCE TO RELATED APPLICATIONS

This application is a continuation of, and claims priority from, commonly-owned, co-pending U.S. application Ser. No. 11/093,584, filed on Mar. 30, 2005, which is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of disaster recovery for computer systems and more particularly relates to the field of write set boundary management in support of asynchronous update of secondary storage.

BACKGROUND OF THE INVENTION

Disaster recovery strategies for computer systems generally involve copying data stored at a primary site to a secondary site which is typically located some distance from the primary site. Copying from the primary copy to the secondary copy may be performed either synchronously or asynchronously. Where copying is performed synchronously, each time an update is written to the primary copy, the update is also sent to the secondary site to be written to the secondary copy. Only after the secondary site informs the primary site that the secondary copy has been updated does the primary site acknowledge the update to the primary copy and stand ready to write the next update. Thus, updates are written to the primary and secondary copies in the same order. Where copying is performed asynchronously, multiple updates may be written to the primary copy and acknowledged before any updates are sent to the secondary site, as the primary copy is maintained independently from the secondary copy. The updates are sent periodically to the secondary site, typically as a set of writes referred to herein as a "color," and are written to the secondary copy, not necessarily in the same order as they were written to the primary copy.

Where a single color is maintained across multiple storage controllers at the primary site, it is necessary when switching to the next color that all storage controllers switch to the next color in a coordinated fashion to maintain the integrity of "dependent writes" across color boundaries. For example, given the following typical sequence of dependent writes for a data base update transaction:

1. execute a write to update the data base log indicating that a data base update is about to take place, then
2. execute a second write to update the data base, and finally
3. execute a third write to update the data base log indicating that the data base update has completed successfully.

It is imperative that these dependent writes either all belong to the same color, or, if they cross a color boundary, that the earlier write(s) belong to the old color and the later write(s) belong to the new color. In this example, assuming writes 1, 2, and 3 are each written by a different storage controller, if writes 1 and 3 are written as part of color group "red," and write 2 is written as part of the next color group "blue," should the primary copy be lost after the "red" group is written to the secondary copy but before the "blue" group is written to the secondary copy, the data base log in the secondary copy would incorrectly show that the second write to update the data base occurred, when in fact the data base was never updated.

In one technique for maintaining colors and color boundaries across multiple storage controllers at the primary site, before associating a write with a color, each storage controller polls a color control node which maintains the current color and requests the current color. The color control node apprises the storage controller of the current color, and the storage controller associates the write with that color. While this ensures the absolute color switchover of all storage controllers at effectively the same point in time and thereby ensures that the integrity of dependent writes is maintained across the color boundary, each write operation is delayed by the round trip to the color control node, and the color control node might become a bottleneck.

A method for maintaining colors and color boundaries across multiple storage controllers at the primary site that reduces write delay and the risk of bottleneck would therefore be advantageous.

SUMMARY OF THE INVENTION

Briefly, according to an embodiment of the invention a color control node includes an interface for communicating with multiple storage controllers, wherein the storage controllers maintain a primary storage system at a primary site and a secondary storage system at a secondary site; and wherein the storage controllers maintain a current color and associate all writes with the current color without polling the color control node. The color control node also includes operational capability for issuing a polling command to instruct the storage controllers to poll the color control node for the current color prior to associating each write with a new color; receiving an acknowledgment of receipt of the polling command; changing the current color to a new color responsive to receiving the acknowledgment; issuing a storage command to the storage controllers indicating the new color; and instructing each storage controller to cease polling the color control node for the current color.

According to another embodiment of the present invention, a system for maintaining colors and color boundaries across multiple storage controllers includes: a primary data storage system at a primary site, said primary date storage system operating in one of two modes: a normal operation mode for maintaining a current color and associating all writes with said current color; and a color polling mode for polling a color control node for the current color prior to associating each write with a new color; a secondary data storage system at a secondary site; a color control node at the primary site, the color control node including: an interface for communicating with the multiple storage controllers; and operational capability for issuing a polling command to instruct the storage controllers to poll the color control node for the current color prior to associating each write with the new color; receiving an acknowledgment of receipt of the polling command; changing the current color to the new color responsive to receiving the acknowledgment issuing a storage command to the storage controllers indicating the new color; and instructing each storage controller to cease polling the color control node for the current color.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
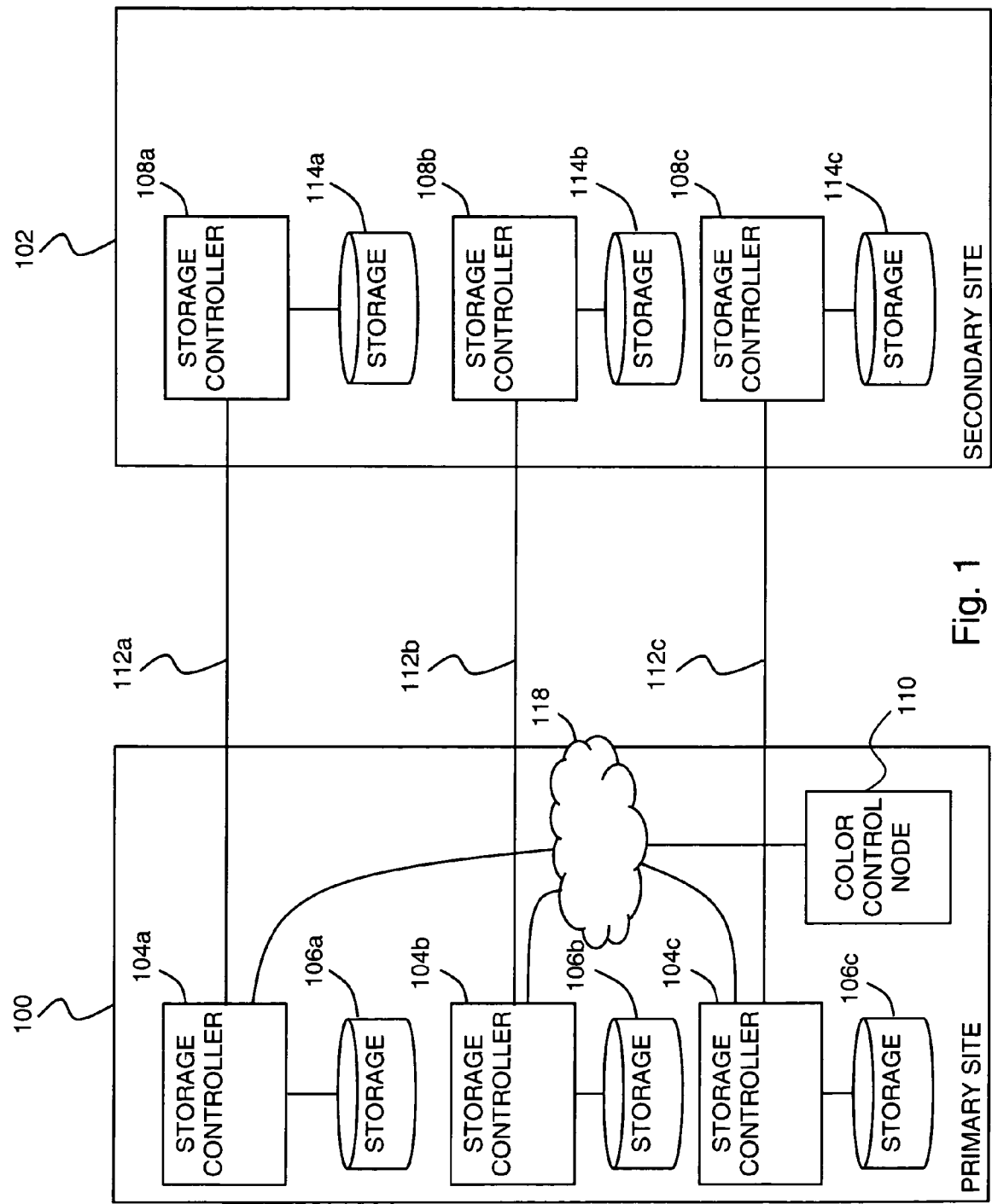
FIG. 1 is a simplified block diagram illustration of a system of primary and secondary data storage, constructed and operative in accordance with a preferred embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Reference is now made to FIG. 1, which is a simplified block diagram illustration of a system of primary and secondary data storage, constructed and operative in accordance with a preferred embodiment of the present invention. In the system of FIG. 1, a primary site 100 includes storage controllers 104a, 104b, and 104c, coupled to storage systems 106a, 106b, and 106c, respectively. Storage controllers 104a, 104b, and 104c manage Input/Output (I/O) access to volumes in storage systems 106a, 106b, 106c from host systems (not shown). Storage controllers 104a, 104b, and 104c are preferably configured to copy data to corresponding remote storage controllers 108a, 108b, and 108c at a secondary site 102 via connections 112a, 112b, and 112c.

Storage controllers 104a, 104b, and 104c preferably periodically transmit sets of data writes, referred to herein as "colors," to the remote storage controllers 108a, 108b, and 108c, in accordance with conventional techniques, where the remote storage controllers 108a, 108b, and 108c write the data to their respective attached storage systems 114a, 114b, and 114c. Although FIG. 1 illustrates a certain number of components at sites 100 and 102, such as three storage controllers and storages each, it is appreciated that any number of storage controllers and storage systems may be used.

Secondary site 102 may be hundreds or thousands of miles from the primary site 100. The connections 112a, 112b, 112c between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Primary Area Network (LAN), or the Internet.

Host systems (not shown) at primary site 100 may perform Input/Output (I/O) operations with respect to volumes in the storage systems 106a, 106b, and 106c. The host systems may communicate with storage controllers 104a, 104b, and 106c via any network or connection known in the art.

Storage controllers 104a, 104b, 104c, 108a, 108b, and 108c preferably include a processor complex and may comprise any storage controller or server known in the art, such as the IBM Enterprise Storage Server (ESS®), 3990 Storage Controller. Storage systems 106a, 106b, 106c, 104a, 114b, and 114c may comprise an array of storage devices, such as a Just a Bunch of Disks (JBOD) or a Redundant Array of Independent Disks (RAID) array.

Each storage controller 104a, 104b, and 104c at primary site 100 preferably communicates, via a network 118, with a color control node 110 which maintains the current color. Prior to associating a write with a color, each storage controller 104a, 104b, and 104c polls color control node 110 and requests the current color. Color control node 110 apprises the requesting storage controller of the current color, and the storage controller associates the write with that color in accordance with conventional techniques.

Figure 2:
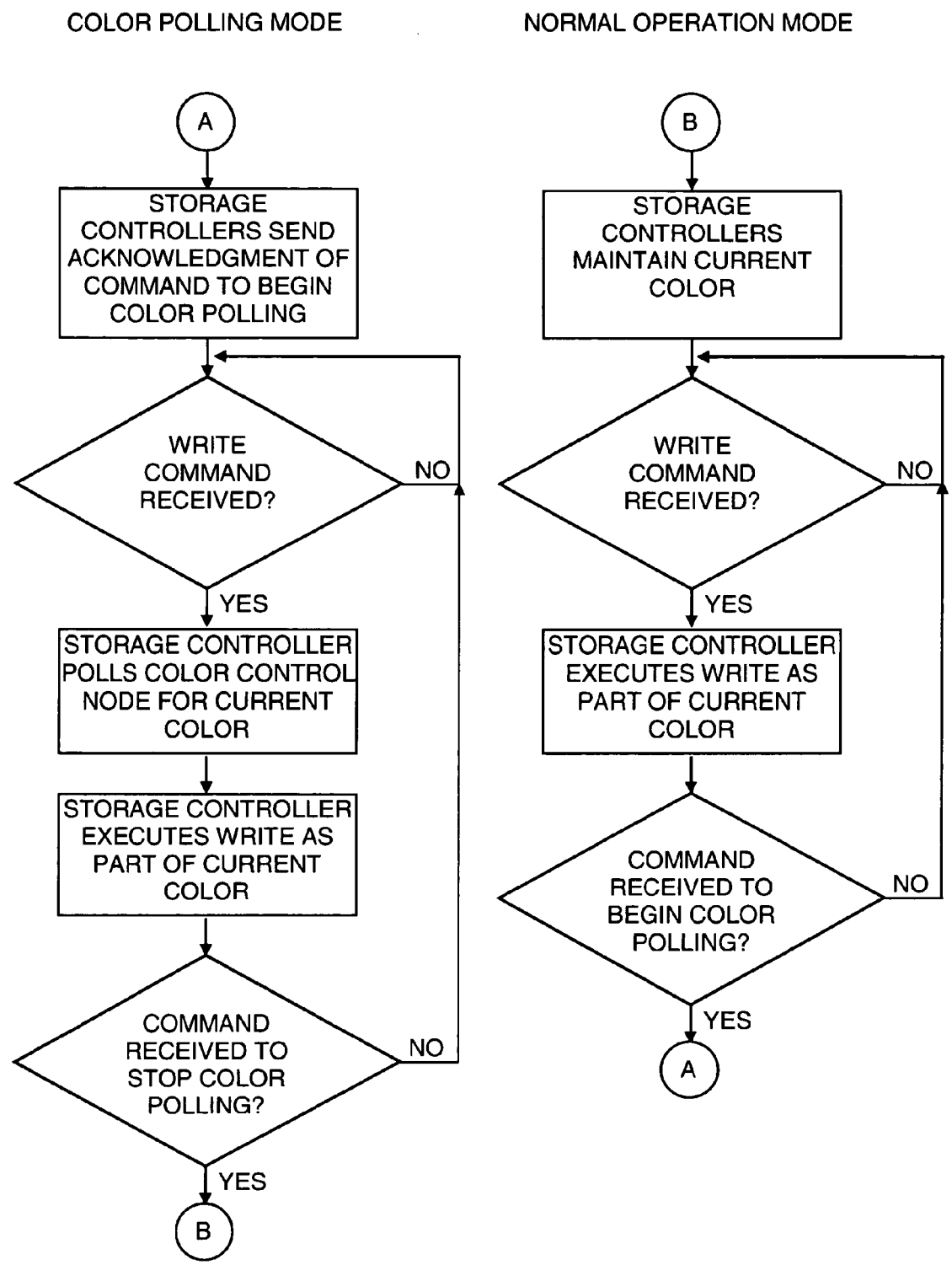
FIGS. 2 and 3 are simplified flowchart illustrations of a method for maintaining colors and color boundaries across multiple storage controllers, operative in accordance with a preferred embodiment of the present invention.
Figure 3:
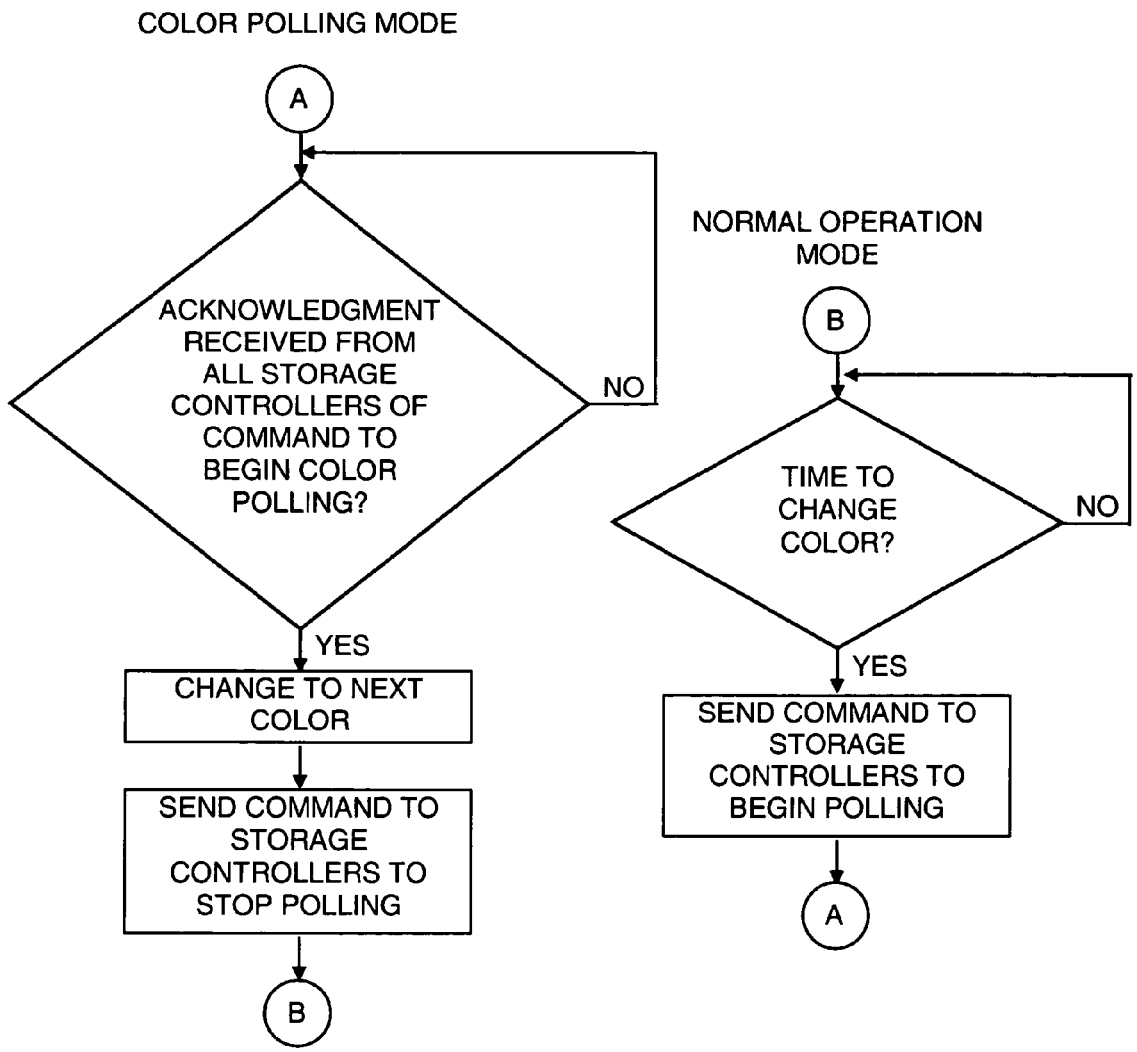

Reference is now made to FIGS. 2 and 3, which are simplified flowchart illustrations of a method for maintaining colors and color boundaries across multiple storage controllers, operative in accordance with a preferred embodiment of the present invention. The method of FIGS. 2 and 3 may be understood with reference to the primary and secondary data storage system of FIG. 1, where the method of FIG. 2 is preferably implemented by storage controllers 104a, 104b, and 104c, and the method of FIG. 3 is preferably implemented by color control node 110.

In the method of FIGS. 2 and 3, which may be understood with reference to the primary and secondary data storage system of FIG. 1, primary site 100 operates in either of two modes: a normal operation mode and a color polling mode. During normal operation, each storage controller 104a, 104b, and 104c at primary site 100 maintains the current color and associates all writes with that color without polling color control node 110.

Just prior to switching to a new color, such as in accordance with a predefined schedule, primary site 100 reverts to color polling mode with color control node 110 issuing a command to storage controllers 104a, 104b, and 104c to poll color control node 110 for the current color prior to associating each write with a color. Each of storage controllers 104a, 104b, and 104c send an acknowledgment of receipt of the command to color control node 110. Once color control node 110 receives an acknowledgment from each of storage controllers 104a, 104b, and 104c, color control node 110 changes to the new color.

Color control node 110 then issues a command to storage controllers 104a, 104b, and 104c indicating the new color and instructing storage controllers 104a, 104b, and 104c to stop polling color control node 110 for the current color. Primary site 100 then reverts to normal operation mode, with storage controllers 104a, 104b, and 104c establishing and maintaining the new color as the current color and associating all writes with the new-and-now-current color without polling color control node 110.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

We claim:

1. A color control node comprising:
    an interface for communicating with a plurality of primary storage controllers, wherein said plurality of primary storage controllers are operatively coupled with primary storage systems at a primary site; and
    wherein the plurality of primary storage controllers periodically transmit sets of data writes, known as colors, to secondary storage controllers for writing to secondary storage systems at remote sites; and
    wherein the primary site operates in a normal operating mode while maintaining a current color and associates all writes with said current color without polling the color control node when maintaining said current color; and
    wherein the primary site switches to a color polling mode when the current color is to be changed to a new color;
    wherein the switch to the color polling mode causes a querying of the color control node for every write operation; and
    wherein the color control node further comprises operational capability for asynchronous updating, said asynchronous updating comprising steps of:
        responsive to the switch to the color polling mode, issuing a command to instruct the primary storage controllers to poll the color control node for the current color prior to associating each write with said current color;
        receiving an acknowledgment of receipt of the polling command from all of the primary storage controllers;
        changing to the new color responsive to the acknowledgment;
        establishing the new color as the current color;
        issuing a command to the primary storage controllers indicating the new color as the current color for associating all writes and instructing the primary storage controllers to stop polling the control node for the current color;
    wherein the primary site then reverts to the normal operating mode, with the primary storage controllers associating all writes with the current color without polling the color control node.

2. The color control node of claim 1 wherein the primary site switches to the color polling mode in accordance with a predefined schedule.

3. A system for maintaining colors and color boundaries across multiple storage controllers, the system comprising:
    a primary site comprising a plurality of primary storage controllers operatively coupled with primary storage systems, wherein said plurality of primary storage controllers periodically transmit sets of data writes, known as colors, to secondary storage controllers for writing to secondary storage systems at remote sites; and
    wherein the primary site operates in a normal operating mode while maintaining a current color and associates all writes with said current color without polling a color control node when maintaining said current color;
    wherein the primary site switches to a color polling mode when the current color is to be changed to a new current color;
    wherein the primary site polls the color control node subsequent to receiving the instruction to poll said color control node and in response, receives the storage command from the color control node indicating the new current color to associate with all writes; and
    wherein the primary site reverts to the normal operating mode when at least one of the plurality of primary storage controllers is instructed by the color control node to stop polling the color control node for the current color; and
    wherein the system further comprises:
        the color control node operatively coupled with at least one of the plurality of primary storage controllers, said color control node comprising:
            an interface for communicating with the plurality of primary storage controllers; and
            operational capability for asynchronous updating comprising steps of:
                responsive to the switch to the color polling mode, issuing a command to instruct the primary storage controllers to poll the color control node for the current color prior to associating each write with said current color;
                receiving an acknowledgment of receipt of the command from all of the primary storage controllers;
                changing to the new color responsive to the acknowledgment;
                establishing the new color as the new current color; and
                issuing a command to the primary storage controllers indicating the new color as the current color for associating all writes and instructing the primary storage controllers to stop polling the control node for the current color.

4. The system of claim 3 wherein at least one of the plurality of the primary storage controllers comprise an enterprise storage server.

5. The system of claim 3 wherein at least one of the plurality of the primary storage controllers comprise an array of storage devices.

6. The system of claim 3 wherein the primary storage controllers are operatively coupled with the second storage controllers via a dedicated fiber optical network.

7. The system of claim 3 wherein the primary storage controllers are operatively coupled with the second storage controllers via the Internet.

8. The system of claim 3 wherein the color control node is located at the primary site.

9. The system of claim 8 wherein the color control node is operatively coupled with each of the plurality of primary storage controllers.

10. The system of claim 3 further comprising a plurality of host systems at the primary site, wherein said host systems are operable for communicating with the primary storage controllers.

11. The system of claim 10 wherein the host systems perform input/output operations on data in the primary storage systems.

12. The system of claim 3 wherein the primary site switches to the color polling mode in accordance with a predefined schedule.

13. The color control node of claim 1 wherein the switch to the color polling mode is initiated by said color control node.

14. The color control node of claim 1 wherein the switch to the color polling mode occurs in response to a host system at the primary site starting to poll.

15. The color control node of claim 1 wherein the asynchronous updating further comprises issuing a storage command to the primary storage controllers indicating the new current color after establishing said new color as the current color.

* * * * *

UNITED STATES PATENT AND TRADEMARK OFFICE
CERTIFICATE OF CORRECTION

| | | |
|---|---|---|
| PATENT NO. | : 8,200,916 B2 | Page 1 of 1 |
| APPLICATION NO. | : 12/361504 | |
| DATED | : June 12, 2012 | |
| INVENTOR(S) | : Shira Ben Dor et al. | |

It is certified that error appears in the above-identified patent and that said Letters Patent is hereby corrected as shown below:

On the Title Page, item [75] inventor should read: "Aviad Zlotnik" instead of "Avied Zlotnik".

Signed and Sealed this
Fourth Day of November, 2014

Michelle K. Lee
*Deputy Director of the United States Patent and Trademark Office*